(12) United States Patent
Papierniak et al.

(10) Patent No.: US 6,175,838 B1
(45) Date of Patent: Jan. 16, 2001

(54) METHOD AND APPARATUS FOR FORMING PAGE MAP TO PRESENT INTERNET DATA MEANINGFUL TO MANAGEMENT AND BUSINESS OPERATION

(75) Inventors: Karen A. Papierniak, St. Paul, MN (US); Luo-Jen Chiang, Freehold, NJ (US); James E. Thaisz, Lincroft, NJ (US); Frank Lou, Bridgewater, NJ (US)

(73) Assignee: NCR Corporation, Dayton, OH (US)

(*) Notice: Under 35 U.S.C. 154(b), the term of this patent shall be extended for 0 days.

(21) Appl. No.: 09/067,805

(22) Filed: Apr. 29, 1998

(51) Int. Cl.[7] .................................................. G06F 13/00
(52) U.S. Cl. ............................................ 707/223; 709/224
(58) Field of Search ........................... 707/513; 709/203, 709/217–219, 223–226, 233–235

(56) References Cited

U.S. PATENT DOCUMENTS

| | | | |
|---|---|---|---|
| 5,708,780 | * | 1/1998 | Levergood et al. ................... 709/229 |
| 5,774,670 | * | 6/1998 | Montulli ......................... 395/200.57 |
| 5,794,219 | * | 8/1998 | Brown ................................... 705/37 |
| 5,796,952 | * | 8/1998 | Davis et al. ..................... 395/200.54 |
| 5,870,549 | * | 2/1999 | Bobo, II ......................... 395/200.36 |
| 5,892,917 | * | 11/1999 | Myerson ......................... 395/200.54 |
| 5,903,715 | * | 5/1999 | Sawano ................................. 395/114 |
| 5,913,041 | * | 7/2000 | Ramanathan et al. ............... 709/233 |
| 5,953,729 | * | 9/1999 | Cabrera et al. ....................... 707/204 |
| 5,977,964 | * | 11/1999 | Williams et al. ..................... 345/327 |
| 5,991,740 | * | 11/1999 | Messer ................................... 705/27 |
| 5,999,971 | * | 12/1999 | Buckland ............................. 709/218 |
| 6,006,197 | * | 12/1999 | D'Eon et al. .......................... 705/10 |
| 6,006,260 | * | 12/1999 | Barrick, Jr. et al. ................. 709/224 |
| 6,009,410 | * | 12/1999 | LeMole et al. ........................ 705/14 |
| 6,064,656 | * | 5/2000 | Angal et al. ..................... 709/213 X |
| 6,088,718 | * | 7/2000 | Altshuler et al. .................... 709/203 |

OTHER PUBLICATIONS

Oliver, Dick, et al, Netscape 3 Unleashed Sams.net Publishing, pp. 244, 248–249, 352–358, 367–368, 610–611, 1996.*

Schildt, Herbert, Advanced C, Osborne McGraw–Hill, pp. 38–39, 1986.*

* cited by examiner

*Primary Examiner*—Joseph H. Feild
(74) *Attorney, Agent, or Firm*—Ying Tuo; Benjamin J. Hauptman (57) ABSTRACT

Conventionally, a web site stores Internet data indicating file access status for the files that have been accessed in response to requests from web browsers. Unfortunately, the Internet data are kept as a set of separate and non-correlated data records that are chronologically arranged according to the times at which the requests have been received and processed. Consequently, the Internet data are not arranged meaningful to management and business operation. The present invention correlates web page files (HTML, SHTML, DHTML, or CGI files) with other type files (GIF, JPEG, or AVI files), so that the Internet data can be presented in a format meaningful to management and business operation.

13 Claims, 6 Drawing Sheets

RECORD $J_1$ : ........ (FOR WEB PAGE FILE)

⋮

RECORD $J_2$ : ........ (FOR GIF FILE)

⋮

RECORD $J_3$ : ........ (FOR JPEG FILE)

⋮

RECORD $J_4$ : ........ (FOR AVI FILE)

METHOD AND APPARATUS FOR FORMING PAGE MAP TO PRESENT INTERNET DATA MEANINGFUL TO MANAGEMENT AND BUSINESS OPERATION

BACKGROUND OF THE INVENTION

The present invention relates generally to a method and apparatus for presenting Internet data in a format meaningful to management and business operation.

With the development in information technology and networking infrastructure, more and more business transactions are being conducted electronically over the Internet. Using the Internet to conduct business transactions are now getting so popular that it is currently well know as electronic commerce (or Internet commerce) by the industries and public. It is fair to predict that electronic commerce is having an enormous impact on the way businesses will be conducted and managed in the future. Thus, there is a great interest in studying and understanding consumers' behavior and decision process in electronic commerce environment.

Traditionally, business transactions have been conducted at business premises, and there exist methods and techniques to study consumers behavior and decision process for traditional business environment. For example, a retailer can display its goods in store shelves arranged in accordance with the changes of the four seasons. By observing consumers' reactions to the arrangement, the retailer can adjust the layout of the shelves to facilitate sales of its goods.

In electronic commerce environment, a retailer or service provider typically displays information about its goods or services in a web site (which includes at least one server) via the Internet. Specifically, the server for the web site stores the information in a set of web page files, such as HTML (Hypertext Markup Language) files. In addition to containing text content, an HTML file may also contain links to other type files, such as graphic or audio files, for displaying pictures and icons and playing audio message. An HTML file may also contain links to other web page files. The other type files can be also stored on the server. By using his/her web browser, a customer (or a potential customer) can remotely navigate through the web site, gaining the information about the goods and services, or ordering selected goods or services. Unfortunately, unlike in traditional business environment, there is no reliable method in electronic commerce environment at the present time to measure the effectiveness of the layout of a web site. This is due to the difficulties in observing consumers' behavior and analyzing consumers' decision process over the Internet.

Historically, the Internet was designed as an open structure in which the main purpose is to exchange information freely without restriction. To obtain a web page file (such as an HTML file) from a web site, a web browser first sends a request to the server for that web site. Upon receiving the request, the server retrieves the HTML file requested and send it to the web browser. Upon receiving the HTML file, the web browser displays the HTML file as a web page. If the HTML file also contains links to other type files (such as graphic or audio files), the browser subsequently sends requests to the server for these files. Upon receiving the requests, the server retrievers these files and send them to the web browser. Upon receiving theses files, the browser displays pictures and icons on the web page, or executes an application to play audio files embedded in the web page. If the HTML file also contains a link to another HTML file, upon clicking (or activating) the link, the browser sends a further request to the server for the HTML file. Upon receiving the further request, the server retrievers the HTML files and sends it to the web browser. It should be noticed that browsers interact with web sites in a stateless fashion. On the Internet, a particular web site can be accessed by thousands of browsers in a random fashion. While a browser is sending a sequence of requests to a web site, it does not maintain a constant connection to that web site between any two consecutive requests. To a server, it has no control over the sequences of requests; a subsequent request may not have any logical relationship with the previous one; a sequence of requests may come from different web browsers; a request may be generated from a link embedded in an HTML file. Consequently, it is difficult to consecutively observe customers' activities and behavior in electronic commerce environment over the Internet.

Current technology provides mechanisms to record access status data (or Internet data) for web page and other type files while a sequence of requests are being received and processed by a server. However, the Internet data are kept as a set of separate and non-correlated data records that are chronologically arranged according to the times at which the requests were received and processed. Consequently, Internet data, without further processing, are not meaningful to management and business operation. In addition, since Internet data are recorded mainly for the purpose of administrating web sites, they may contain redundant and erroneous data that have no use to management and business operation analysis. When Internet data are further processed by other applications (such as by data warehouse applications), these redundant and erroneous data are undesirable because they wastefully occupy storage space and may cause errors in reports or during analysis.

Moreover, Internet data may be generated by different types of servers that may use different formats to record the Internet data. In other words, Internet data generated by different types of servers are not compatible in format. This causes further problem to utilize Internet data.

Therefore, there is a need for a method and apparatus to present Internet data in a format that is meaningful to management and business operation.

There is another need for a method and apparatus to present Internet data in a format that can be further efficiently utilized.

There is yet another need for a method and apparatus to filter Internet data to facilitate further analyzing process.

There is still another need for a method and apparatus to combine Internet data from multiple servers, possibly from different types of servers, into a coherent format.

The present invention meets these needs.

SUMMARY OF THE INVENTION

The present invention provides a novel method and associated apparatus for processing Internet data.

Conventionally, a web site is able to store Internet data indicating file access status for the files that have been accessed in response to requests from web browsers. Unfortunately, the Internet data are kept as a set of separate and non-correlated data records that are chronologically arranged according to the times at which the requests have been received and processed. Typically, a web page is associated with a web page file, which can further embed other type files. However, the data records indicating access status for a web page file and other type files embedded in the web page file can be scattered among multiple data records. Consequently, the Internet data are not arranged meaningful to management and business operation.

The present invention presents the Internet data into a format meaningful to management and business operation. More specifically, the present invention can correlate the data record for a web page file with the data records for other type files that are embedded in the web page file.

In a broad aspect, the invention provides a method used with a server containing a plurality of web pages and logs. Each of the web pages contains a web page file and one or more other type files. Each of the logs contains data indicating access status for the web page files and other type files. The method comprises the steps of:

receiving data from the server;

identifying data for web page files that have been accessed;

identifying data for other type files that are respectively linked in the web page files; and correlating the data for the other files that are respectively linked in the accessed web page files into the data for the web page files.

These and other features and advantages of the present invention will become apparent from the following description and accompanying drawings.

BRIEF DESCRIPTION OF THE DRAWINGS

The purpose and advantages of the present invention will be apparent to those skilled in the art from the following detailed description in conjunction with the appended drawing, in which.

DETAILED DESCRIPTION OF THE PREFERRED EMBODIMENT

The present invention comprises a novel method and an associated apparatus for presenting Internet data. The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

Figure 1:
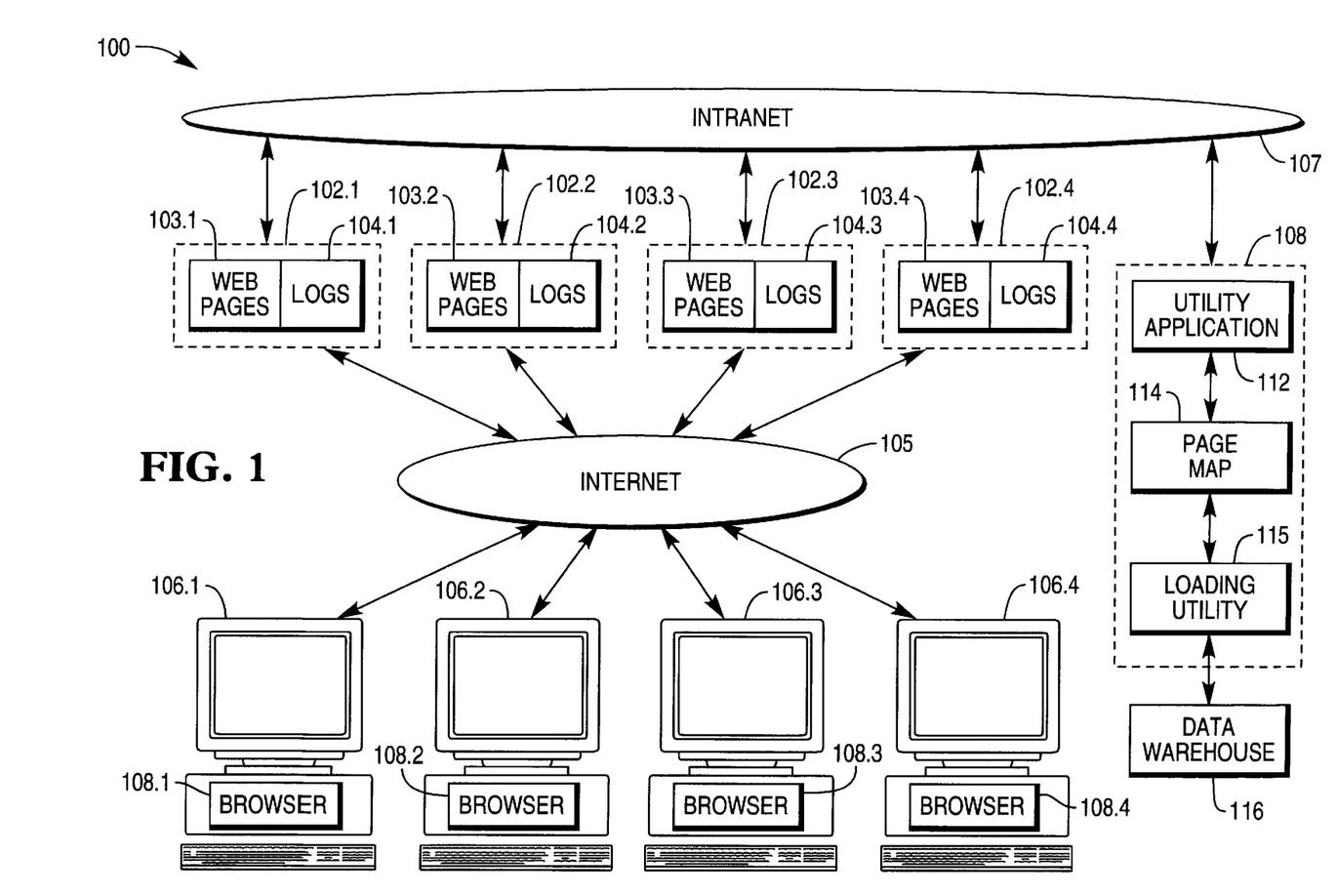
FIG. 1 shows an exemplary network system, including a novel Internet data processing computer, in accordance with the present invention.

Referring to FIG. 1, there is shown an exemplary network system 100 including Internet 105 and Intranet (or LAN—Local Area Network) 107, in accordance with the present invention.

Connected to Internet 105 are four servers ($102._1$, $102._2$, $102._3$, and $102._4$) for four respective web sites and four user terminals or computers ($106._1$, $106._2$, $106._3$, and $106._4$). Connected to Intranet 106 are four servers ($102._1$, $102._2$, $102._3$, and $102._4$) and a data processing computer 108. Connected to data processing computer 108 is a data warehouse 116.

It should be noted that, in describing the present invention, FIG. 1 shows that only four servers and four user computers are connected to Internet 105. In reality, Internet 105 connects thousands of servers and user computers.

Each of the four servers ($102._1$, $102._2$, $102._3$, or $102._4$) includes a respective web page repository ($103._1$, $103._2$, $103._3$, or $103._4$) and a respective set of server logs ($104._1$, $104._2$, $104._3$, or $104._4$). Each of the four web page repositories ($103._1$, $103._2$, $103._3$, or $103._4$) stores a plurality of web page files (such as HTML, SHTML, DHTML, or CGI files). A web page file may contain links to other type files (such as AVI, GIF, JPEG, and PNG files). (Note: HTML stands for Hypertext Markup Language, SHTML for Secure HTML, DHTML for Dynamic HTML, CGI for Common Gateway Interface, GIF for Graphics Interchange Format, JPEG for Joint Photographic Expert Group, AVI for Audio Video Interleave, and PNG for Portable Network Graphic). The other type files are also stored in one of the four servers. Each of the four set of server logs ($104._1$, $104._2$, $104._3$, or $104._4$) contains access status data (or Internet data) indicating access status for the files that have been accessed, or attempted to be accessed.

Each of the four user computers ($106._1$, $106._2$, $106._3$, or $106._4$) runs a respective web browser ($108._1$, $108._2$, $108._3$, or $108._4$), each of which is able to obtain files from any one of the four servers via Internet 105, and displays these files in a web page format. To obtain a web page file from a server, a web browser sends an Get request to that server. A Get request contains the IP address identifying the user computer on which the browser is being run and a URL (Uniform Resource Locator). The URL contains the name of and path to the web page file. Upon receiving the Get request, the server retrieves the web page file according to the URL in the Get request and sends the web page file to the user computer (on which the browser is being run) identified by the IP address in the Get request. The server then records access status data for the web page file in a server log. Upon receiving the web page file, the web browser displays it as a web page. If the web page file also contains links to other type files, the browser further sends Get requests to the server, so that these files can be obtained and displayed together with the web page file. The links embedded in the web page file contain the names of and paths to these files. After sending these files to the browser, the server records access status data for these files in the server log. If the web page file further contains a link to another web page file, in response to clicking (activating) the link, the browser sends a Get request to the server, so that the web page file can be obtained and a new web page can be displayed. This link contains the name of and path to the web page file. After sending this web page file to the user computer (on which the browser is being run), the server records access status data for the web page file in the server log.

It should be noted that in FIG. 1 browsers ($108._1$, $108._2$, $108._3$, and $108._4$) interact with servers ($102._1$, $102._2$, $102._3$, and $102._4$) in a stateless fashion. The web browsers ($108._1$, $108._2$, $108._3$, and $108._4$) send requests to servers ($102._1$, $102._2$, $102._3$, and $102._4$) in a random manner. While a browser ($108._1$, $108._2$, $108._3$, or $108._4$) is sending a sequence of requests to a server ($102._1$, $102._2$, $102._3$, or $102._4$), it does not maintain a constant connection to that server between any two consecutive requests. To a server, it has no control over the sequences of requests; a subsequent request may not have any logical relationship with the previous one; a sequence of requests may come from different web browsers; a request may be generated from a link embedded in an web page file. Consequently, the Internet data are kept as a set of separate and non-correlated data records that are chronologically generated according to the times at which the requests were received and processed. Thus, the Internet data stored in the four sets of server logs ($104._1$, $104._2$, $104._3$, and $104._4$), without further processing, are not meaningful to management and business operation.

As shown in FIG. 1, data processing computer 108 contains a utility application 112, a page map 114, and a loading utility 115. Via Intranet 107, utility application 112 is able to get access to the four sets of server logs ($104._1$, $104._2$, $104._3$, and $104._4$), to collect data from them, to process the data collected, and to store the processed data in page map 114. Loading utility 115 is able to load the data from page map 114 to data warehouse 116 for further processing.

Figure 2:
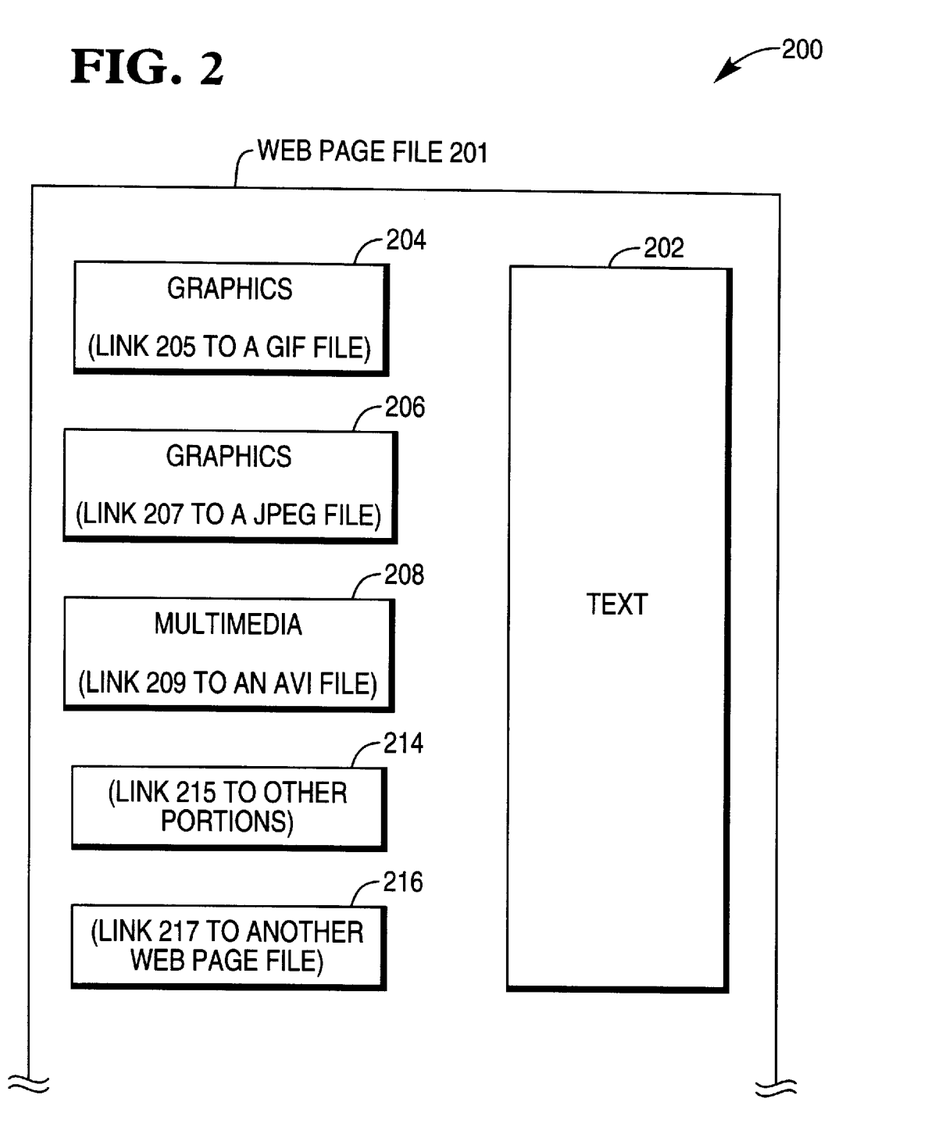
FIG. 2 shows an exemplary web page associated with a web page file.

Referring to FIG. 2, there is shown a portion of a web page 200, which is associated with a web page file (HTML, SHTML, DHTML, or CGI file) 201.

As shown in FIG. 2, the portion of web page 200 contains six regions, including: a text region 202; a graphic region 204, which is associates with a link 205 to a GIF file; a graphic region 206, which is associated with a link 207 to a JPEG file; a multimedia region 208, which is associated with a link 209 to an AVI file; a region 214, which is associated with link 215 to other portions of web page 200; and a region 216, which is associated with a link 217 to another web page file. Links 205, 207, 209, 215 and 217 are embedded in web page file 201.

Figure 3:
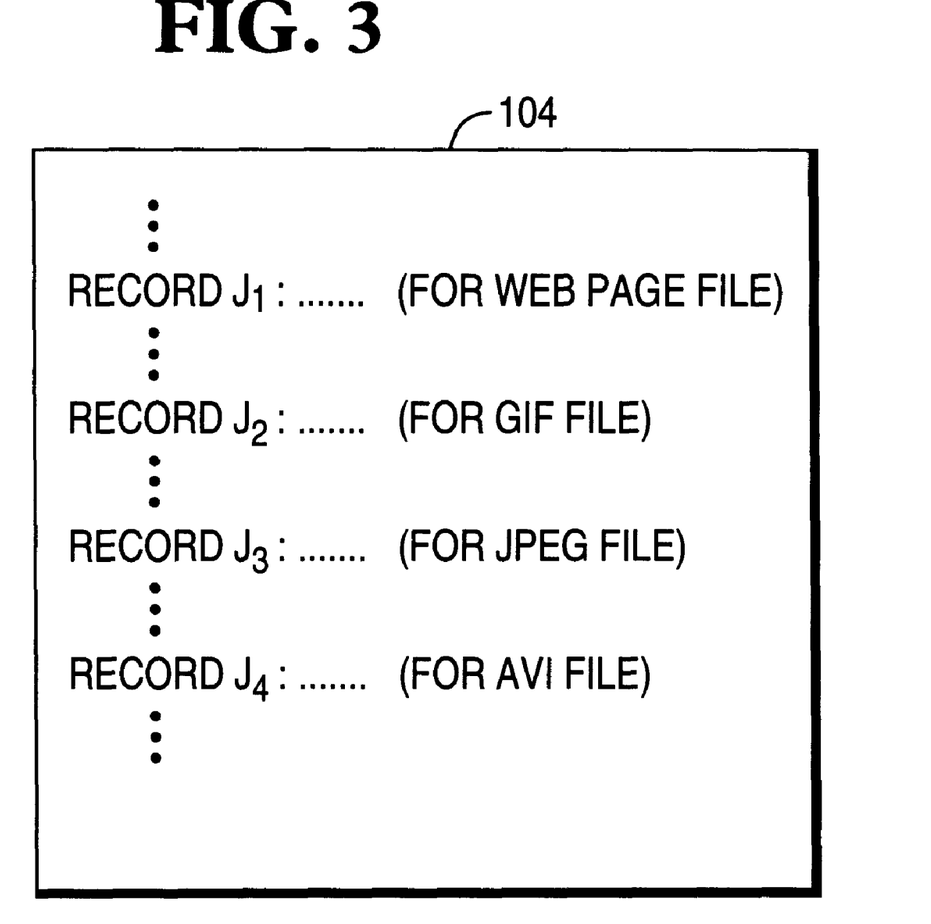
FIG. 3 shows exemplary data records in server logs.

Referring to FIG. 3, there is shown a plurality of exemplary data records in server logs ($104._1$, $104._2$, $104._3$, or $104._4$) in some detail.

As shown in FIG. 3, four records $J_{1-4}$ indicate the access status for web page file 201 and the other type files ( GIF, JPEG and AVI files) that are linked in web page file 201. To better describe the process of generating the four records ($J_{1-4}$), it is assumed that: (1) web page file 201 is stored in page repository $102._1$, (2) web page file 201 has been accessed by browser $108._1$, (3) server $102._1$ generates records $J_{1-4}$ in server logs $104._1$, and (4) the four browsers ($102._1$, $102._2$, $102._3$, and $102._4$) are all sending Get requests to server $102._1$.

To obtain web page file 201, browser $108._1$ sends a Get request to server $102._1$ via Internet 105. The Get request contains the IP address assigned to user computer $106._1$ and an URL indicating the name of and path to web page file 201. Upon receiving the Get request, server $102._1$ retrieves web page file 201 from web page repository $104._1$ and sends it, via Internet 105, to user computer $106._1$ according to the IP address contained in the Get request. In the meantime, server $102._1$ stores information indicating access status for web page file 201 into record $J_1$. Since links 205, 207, and 209 are embedded in web page file 201 to link GIF, JPEG and AVI files respectively, web browser $108._1$ further sends three Get requests to server $102._1$. Links 205, 207 and 209 contains the file names of and paths to GIF, JPEG, and AVI files, respectively. In addition to containing the IP address assigned to user computer $106._1$, the three Get requests contain the file names of and paths to the GIF, JPEG, and AVI files, respectively. Upon receiving the three Get requests, server $102._1$ retrieves the GIF, JPEG and AVI files from web page repository $104._1$ and sends them, via Internet 105, to user computer $106._1$ according to the IP address contained in the Get request. In the meantime, server $102._1$ stores information indicating access status for the GIF, JPEG, and AVI files into records $J_2$, $J_3$, and $J_4$, respectively. As shown in FIG. 2, data records $J_{1-4}$ are scattered among the other records in the server logs $104._1$, because the four browsers ($102._1$, $102._2$, $102._3$, and $102._4$) are all sending Get requests to server $102._1$, and data records in server logs $104._1$ are chronologically generated according to the times when Get requests have been received and processed by server $102._1$. It should be noted that, even though FIG. 3 depicts a process of generating access status information for web page file 210 having a particular web page layout, the principle of FIG. 3 applies to any web page files having any web page layouts.

Typically, each of the records in server logs ($104._1$, $104._2$, $104._3$, and $104._4$) contains the following fields:

IP address assigned to the user computer, user's domain name, name of the request (such as Get), time stamp on which the request was received, URL (including access path to the file and parameters passed), server name, IP address of the server, bytes received from the browser, bytes sent to the browser, and status code indicating operational status of processing the request.

Figure 4:
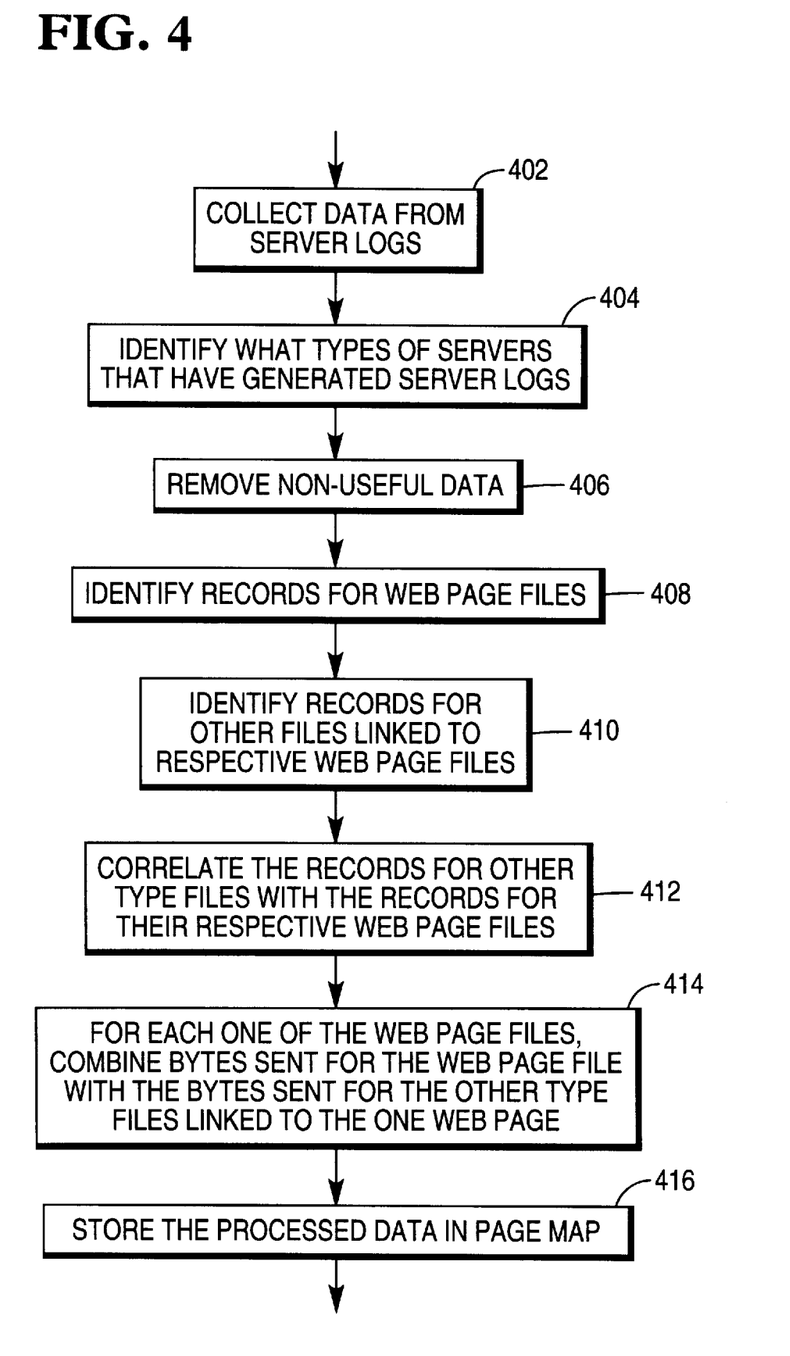
FIG. 4 shows a flowchart illustrating the operation of forming page map shown in FIG. 1, in accordance with the present invention.

Referring to FIG. 4, there is shown a flowchart illustrating the operation of forming page map 114 by utility application 112 shown in FIG. 1, in accordance with the present invention.

In step 402, utility application 112 collects Internet data stored in server logs ($104._1$, $104._2$, $104._3$, and $104._4$) via Intranet 107.

In step 404, utility application 112 identifies what types of servers that have generated the Internet data, because the four sets of server logs ($104._1$, $104._2$, $104._3$, and $104._4$) can be generated by different types of servers. For example, the four servers ($102._1$, $102._2$, $102._3$, and $102._4$) shown in FIG. 1 can be a web server, hosting web server with virtual domains, commerce server, and proxy server, respectively. Since different types of servers may generate Internet data with different formats, the data format and content in one set of server logs ($104._1$, $104._2$, $104._3$, or $104._4$) may be different from those in the other three sets of server logs. By identifying server type, utility application 112 can process the Internet data in a way that is suitable to the data format and content in the identified server logs. In doing so, utility application 112 can process and combine Internet data generated by different types of servers. In the present invention, the server type can be identified by the fields included and orders of the fields in the server logs.

In step 406, utility application 112 removes non-useful data from the data collected in step 402. By way of example, a backspace in a URL is non-useful character; one of the two "/" in a URL is a non-useful character because two "//" have the same meaning as one "/" to a server. Thus, the backspace and one "/" can be removed. By way of another example, the data in a record for retrieving a file associated to a unrecognizable URL is not useful, because no file can be found in response to the URL. Thus, the whole record can be removed. Typically, status code field in a data record indicates whether a request has been successfully processed or not. This step is advantageous because server logs may contain huge volume of data. Keeping non-useful data in applications, such data warehouse applications, not only is wasteful of storage space, it may also cause errors in the reports and during analysis.

In step 408, utility application 112 identifies records that store data indicating file access status for web page files (HTML, STHML, DHTML, or CGI files). In the example shown in FIG. 3, record $J_{-1}$ for web page file 201 shown in FIG. 2 will be identified in step 408.

In step 410, utility application 112 identifies records that store data indicating file access status for other type files (such as GIF, JPEG and AVI files) that are linked into respective web page files. In the example shown FIG. 3, records $J_{2-3}$ can be identified to be linked to web page file 201 shown in FIG. 2.

In step 412, utility application 112 correlates the records for the identified other type files with their respective identified web page files by using the IP address (assigned to the user computer running the browser) and time stamp fields in the these records. As described above, if any other type files are linked into a web page file after a browser has received the web page file, the browser immediately sends requests out to retrieve the other type files. Hence, the IP address in the request for retrieving the web page file is the same IP address in the requests for retrieving the other type files. Also the time at which the request for retrieving the web page file was received should be close to those at which the requests for retrieving the other type files were received. Therefore, utility application 112 correlates the following records together:

(1) a particular record for a particular web page file, which contains an IP address and time stamp, and (2) a set of records for the other type files, which contain the same IP address with that in the particular record; and contain the time stamps close to (within one or two seconds, for example) that in the particular record.

In the example shown in FIG. 3, records $J_{2-4}$ can be correlated with record $J_1$.

In step 414, for each of the web page files, utility application 112 calculates a length by combining the bytes sent for the one web page file with the bytes sent for the other type files linked in the one web page file. In the example shown in FIG. 2, the bytes sent for web page file 201 will be combined with the bytes sent for GIF, JPEG and AVI files. The length is useful for an Internet Service Provider to manage its operation, because it can provide the information to determine the bandwidth used and the cost to send these files.

In step 416, utility application 112 stores the data processed in the steps (406, 408, 410, 412, and 414) in page map 114 shown in FIG. 1.

Figure 5:
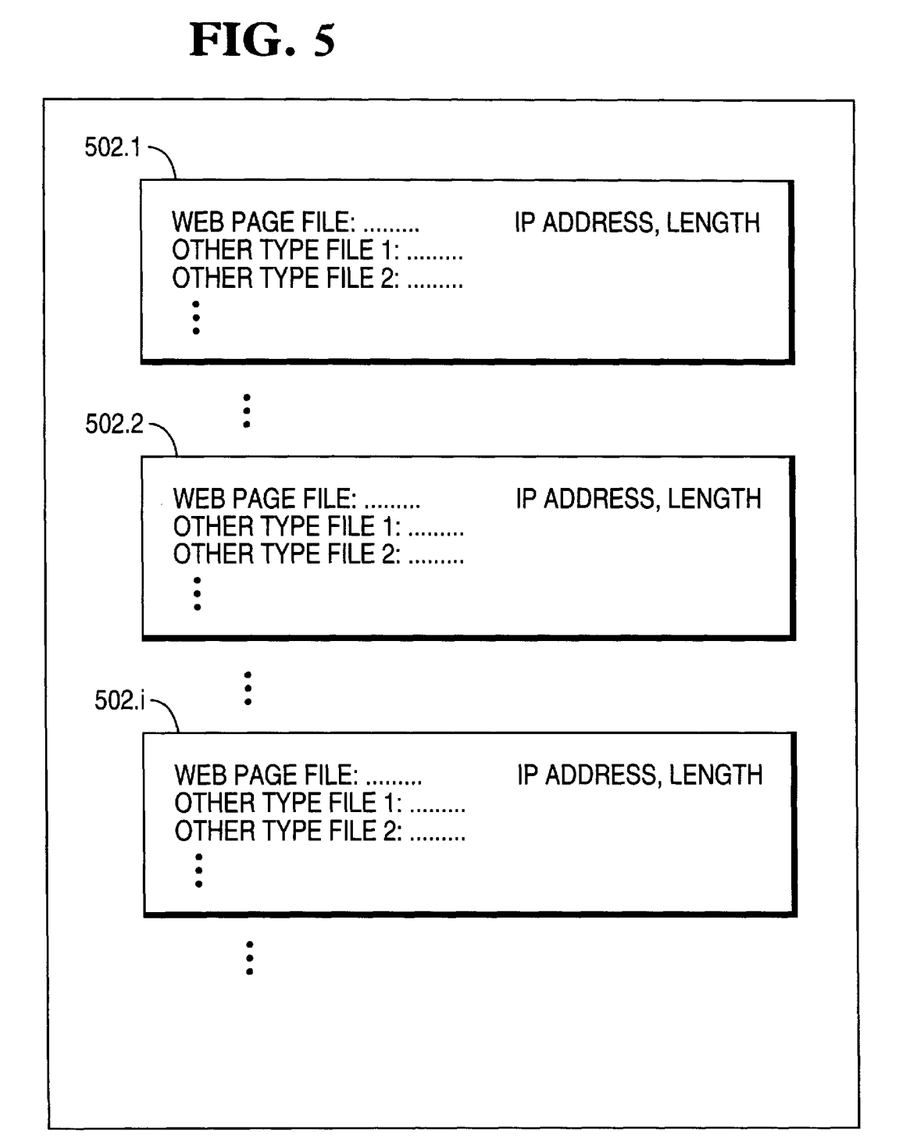
FIG. 5 shows exemplary data records stored in the page map shown in FIG. 1, in accordance with the present invention.

Referring to FIG. 5, there is shown a plurality of exemplary data records in page map 114, in accordance with the present invention.

As shown in FIG. 5, page map 114 contains a plurality of data records $502_{-1}, 502_{-2} \ldots, 502_{-i}, \ldots$. Each of the records may include several physical or logical storage units. Each of the records stores the IP address used by a browser to retrieve a web page file, and the correlated information indicating the access status for the web page file and other type files linked to the web page file. Each of the records also stores a combined length for all the bytes sent for the web page file and the other type files.

Figure 6:
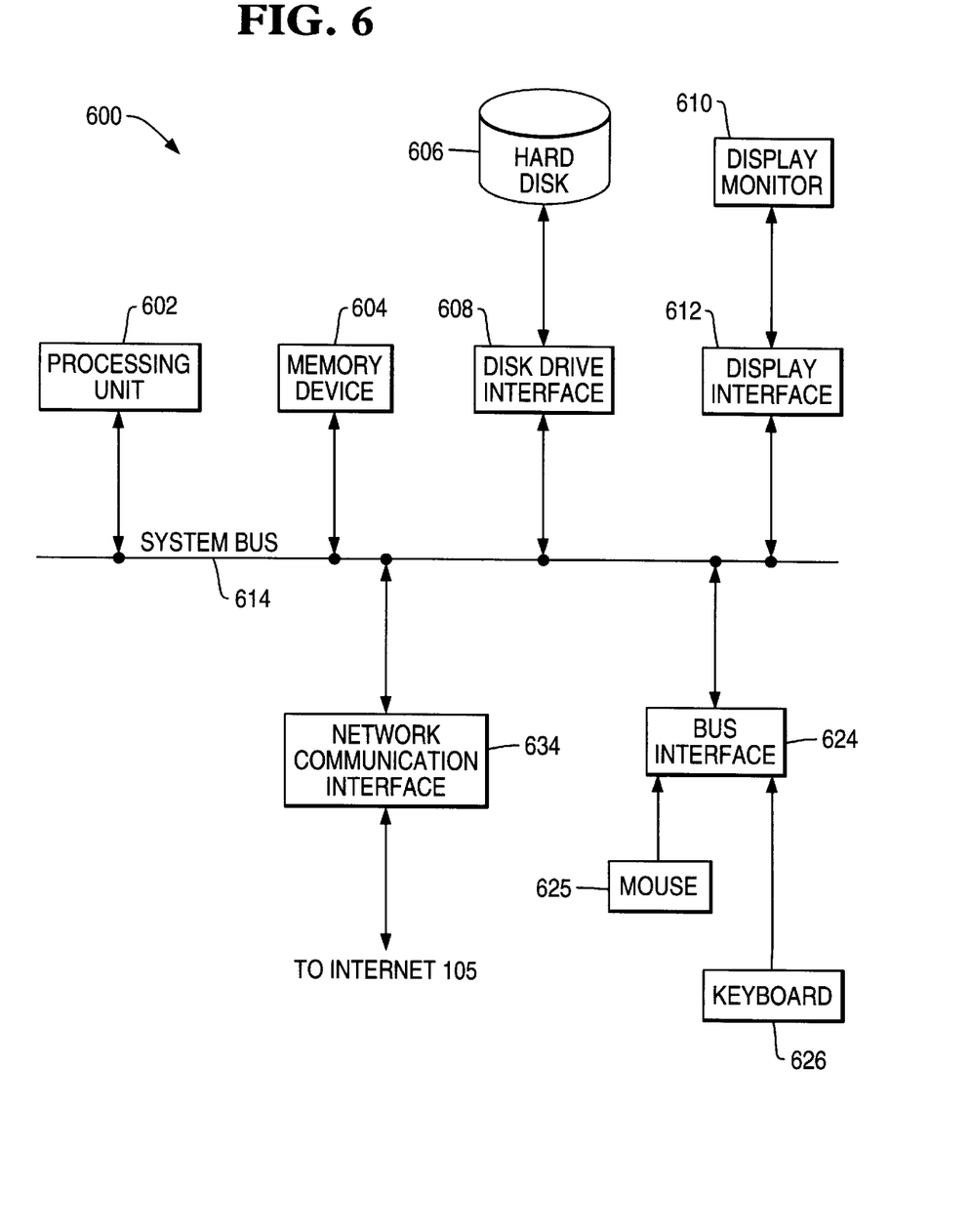
FIG. 6 shows an exemplary computer system that is able run utility application shown in FIG. 1, in accordance with the preset invention.

Referring to FIG. 6, there is shown an exemplary computer system 600 used as data processing computer to run utility application 112, in accordance with the preset invention.

As shown in FIG. 6, computer system 600 comprises a processing unit 602, a memory device 604, a hard disk 606, a disk drive interface 608, a display monitor 610, and display interface 612, a bus interface 624, a mouse 625, a keyboard 626, a network communication interface 634, and a system bus 614.

Hard disk 606 is coupled to disk drive interface 608, display monitor 610 is coupled to display interface 612, and mouse 625 and keyboard 626 are coupled to bus interface 624. Coupled to system bus 614 are: processing unit 602, memory device 604, disk drive interface 608, display interface 612, bus interface 624, and network communication interface 634.

Memory device 604 is able to store programs (including instructions and data). Operating together with disk drive interface 608, hard disk 606 is also able to store programs. However, memory device 604 has faster access speed than hard disk 606, while hard disk 606 has higher capacity than memory device 604.

Operating together with display interface 612, display monitor 610 is able to provide visual interface between programs being executed and a user.

Operating together with bus interface 624, mouse 625 and keyboard 626 are able to provide inputs to computer system 600.

Network communication interface 634 is able to provide an interface between computer system 600 and Intranet 107.

Processing unit 602, which may include one or more processors, has access to memory device 604 and hard disk 606, and is able to control operations of the computer by executing programs stored in memory device 604 or hard disk 606. Processing unit 602 is also able to control the transmissions of programs and data between memory device 604 and hard disk 606.

In the present invention, utility application 112 can be stored in either memory device 604 or hard disk 606, and be executed by processing unit 602.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method for analyzing usage patterns in an electronic commerce environment through a server that contains a plurality of web pages and logs, each of the web pages containing a web page file and one or more other type files, each of the logs containing data for indicating user access status of web page files and the other type files, comprising the steps of:

receiving data from the server;

identifying data for a web page file;

identifying data for other type files that are linked in said web page file;

correlating said data for said other type files with said data for said web page file, and storing said correlated data into an output file;

wherein said web page file, and each of said other type files linked in said web page file, has a file length, and the method further comprises the step of:

combining file lengths of said web page file and said other type files that are linked in said web page file to provide information representative of bandwidth used.

2. The method of claim 1, wherein said web page file is an HTML file, an SHTML file, a DHTML file, or a CGI file; and wherein and said other type files are GIF files, JPEG files, or AVI files.

3. The method of claim 1, further comprising the step of:

filtering non-usable character(s) from said data for indicating access status of said web page file and said data for indicating access status of said other type files.

4. In using with a server that contains a plurality of web pages and logs, each of the web pages containing a web page file and one or more other type files, each of the logs containing data for indicating access status of web page files and other type files, a method comprising the steps of:

receiving data from the server;

identifying data for web page files that have been accessed;

identifying data for other type files that are respectively linked in said accessed web page files; and correlating said data for said other files that are respectively linked in said accessed web page files into said data for said accessed web page files; and the web pages being accessed by different types of users, the method further comprising the steps of:

sorting said correlated data in accordance with the different types of users.

5. The method of claim 4, further comprising the step of:

storing said correlated data into an output file.

6. The method of claim 4, further comprising the step of:

filtering non-usable character(s) from said data for indicating access status of said accessed web page files and said data for indicating access status of said accessed other type files.

7. The method of claim 4, each one of said web page files, or each of said other type files having a file size, and the method further comprising the step of:

combining file sizes of said other type files linked in respective web page files to provide information representative of bandwidth used.

8. The method of claim 4, wherein said web page file is an HTML file, a DHTML file, an SHTML file, or a CGI file; and wherein and said other type files are GIF files, JPEG files, or AVI files.

9. A method for analyzing usage patterns in an electronic commerce environment through use of a plurality of servers each containing a plurality of web pages and logs, each of the web pages containing a web page file and one or more other type of files, each of the logs storing data for indicating access status of web page files or other type files, comprising the steps of:

receiving data from any one of the servers;

identifying a server type for said one server;

identifying data for the web page files that are stored in said one server that has been accessed;

identifying information for other type files that are linked in said respective accessed web page files stored in said one server; and correlating said data for said other type files that are linked in said respective accessed web page files with said data for said accessed web page files stored in said one server; and further comprising the step of:

filtering non-usable character(s) from said identified data.

10. The method of claim 9, further comprising the step of:

storing said correlated data into an output file.

11. The method of claim 9, the accessed web page files and other type files being accessed by different users, the method further comprising the step of:

sorting said correlated data in accordance with characteristics identifying the different users.

12. The method of claim 9, each of said web page files and each of said other type files having a file size, and the method further comprising the step of:

combining file sizes of said files linked in said respective accessed web page to provide information representative of bandwidth used.

13. The method of claim 9, wherein said web page file is an HTML file, a DHTML file, an SHTML file, or a CGI file; and wherein and said other type files are GIF files, JPEG files, or AVI files.

* * * * *

UNITED STATES PATENT AND TRADEMARK OFFICE
CERTIFICATE OF CORRECTION

PATENT NO. : 6,175,838 B1
DATED : January 16, 2001
INVENTOR(S) : Chiang, Luo-Jen, Lou, F., Papierniak, K., and Thaisz, J.

It is certified that error appears in the above-identified patent and that said Letters Patent is hereby corrected as shown below:

Title page,
(54) delete "METHOD AND APPARATUS FOR FORMING PAGE MAP TO PRESENT INTERNET DATA MEANINGFUL TO MANAGEMENT AND BUSINESS OPERATION" and substitute -- METHOD AND COMPUTER ARCHITECTURE FOR FILTERING AND CORRELATING LOG DATA FROM SERVERS USED IN ELECTRONIC COMMERCE APPLICATIONS --.

Column 9,
Line 4, delete "and".

Column 10,
Line 1, delete "and".
Line 38, delete "and".

Signed and Sealed this

Twenty-eighth Day of August, 2001

Attest:

NICHOLAS P. GODICI
*Attesting Officer*    *Acting Director of the United States Patent and Trademark Office*